June 17, 1958  E. A. STALKER  2,839,239
SUPERSONIC AXIAL FLOW COMPRESSORS
Filed June 2, 1954  2 Sheets-Sheet 2

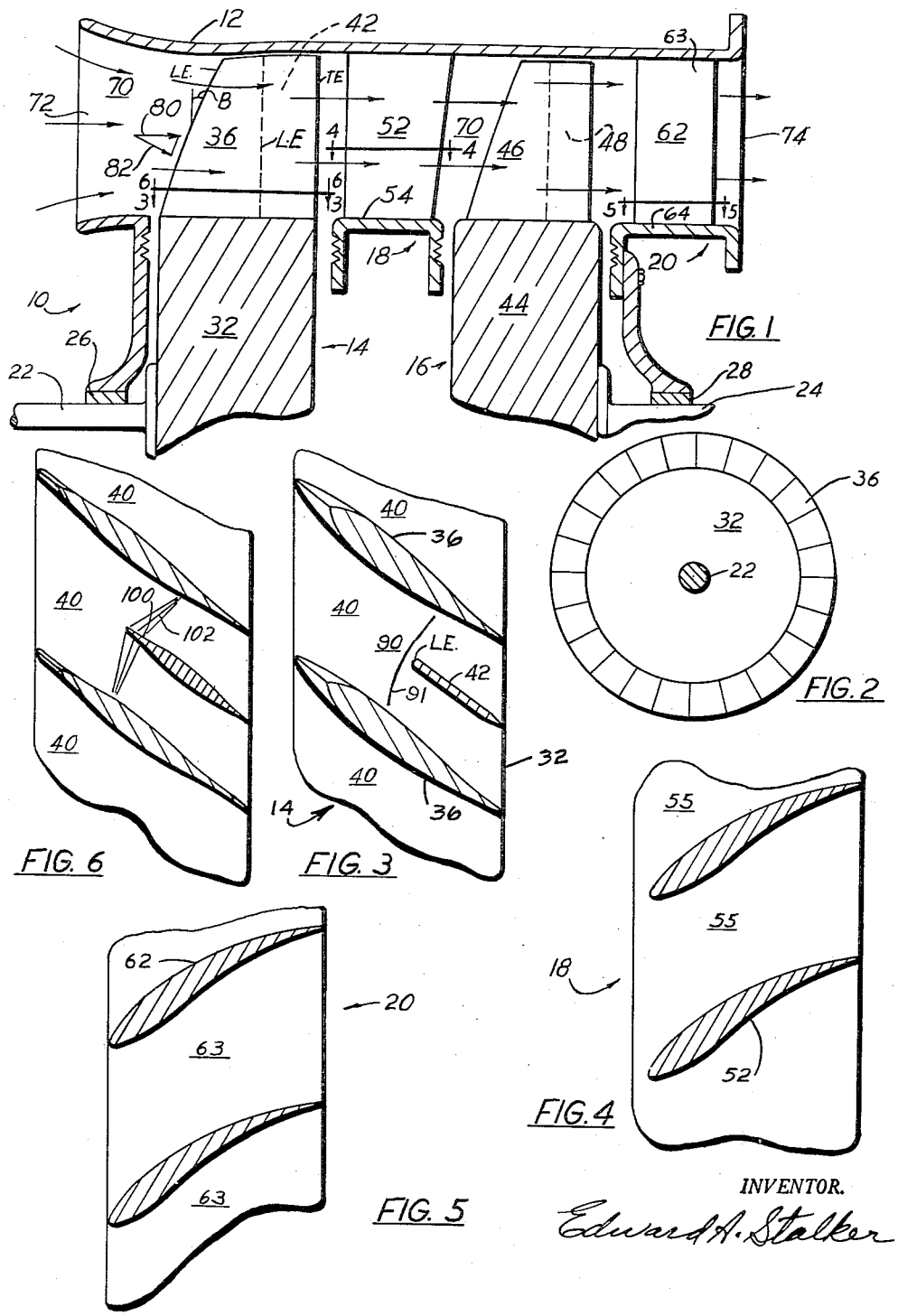

INVENTOR.
Edward A. Stalker

United States Patent Office 2,839,239
Patented June 17, 1958

2,839,239

SUPERSONIC AXIAL FLOW COMPRESSORS

Edward A. Stalker, Bay City, Mich.

Application June 2, 1954, Serial No. 433,890

9 Claims. (Cl. 230—122)

This invention relates to elastic fluid compressors and particularly to axial flow compressors.

An object of the invention is to provide a compressor adapted to operate efficiently into the supersonic range of relative flow.

Another object to provide a compressor of rugged construction for operation at supersonic relative flow.

Other objects will appear from the description, drawings and claims.

The above objects are accomplished by the means illustrated in the accompanying drawings in which—

Fig. 1 is a fragmentary axial section of a compressor according to this invention;

Fig. 2 is a front view of a rotor of the compressor of Fig. 1;

Fig. 3 is a fragmentary development of the blading of the front rotor of the compressor with the blades in section on line 3—3 in Fig. 1;

Fig. 4 is a fragmentary development of the stator with the blades shown in section on line 4—4 in Fig. 1;

Fig. 5 is a fragmentary development of the stator blading of the second stator with the blades shown in section on line 5—5 in Fig. 1;

Fig. 6 is a fragmentary development of the blading of the first rotor showing an alternate form of auxiliary blade;

Figure 7:
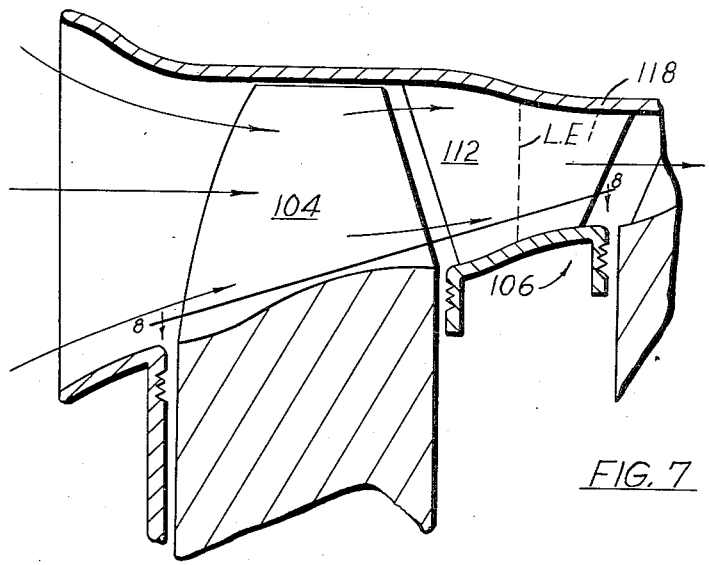
Fig. 7 is an alternate form of the compressor wherein the auxiliary elements are in the stator passages.

Referring now to the drawings, the compressor is indicated generally as 10 in Fig. 1. It comprises the case 12, the rotors 14 and 16, and the stators 18 and 20. The rotors are mounted by shafts 22 and 24 in the bearings 26 and 28. The rotors and stators each define a stage of blades.

The rotor 14 includes the hub 32 upon which are carried the rotor main blades 36 (Figs. 1 and 3) peripherally spaced thereabout with the rotor flow passages 40 between them extending from the front to the rear sides of the rotor. The hub defines an inward surface bounding the rotor passages at their radially inward sides. Between each pair of main blades there is an auxiliary element preferably in the form of a blade 42 whose function will be discussed subsequently.

Rotor 16 has the same type of structure as rotor 14. It includes the hub 44, the main blades 46 and the auxiliary elements or blades 48.

The stator 18 comprises a portion of case 12 defining an outward surface bounding stator passages 55 on their radially outward sides and the peripherally spaced stator blades 52 supported on the case and carrying the inner shroud 54 defining an inward surface bounding the stator passages on their radially inward sides. See Fig. 1.

The stator 20 is similar to stator 18. It comprises the stator blades 62, passages 63, a portion of case 12, and inner shroud 64.

The case, hubs and inner shrouds define an annular channel 70 having the annular inlet 72 and exit 74. The rotor blades span this channel and preferably fit closely to the case at their tips along substantially their whole chord length.

When the rotors are rotated by means of one of the shafts, a flow of fluid, air for instance, is induced through the channel and at high rates of rotation the fluid velocity relative to the rotor blades immediately ahead of the blades becomes supersonic. Where the blade tip speed relative to the case is sonic or supersonic it follows that the tip speed relative to the flow will necessarily be supersonic by reason of the addition of the axial component of the flow velocity.

The rotor blades have their leading edges LE inclined rearwardly or downstream at their tips. Thus the leading edges are inclined to the relative flow vector 80 as shown in Fig. 1. The magnitude of this vector is preferably such that the normal component 82 is less than the speed of sound in the local fluid, that is fluid just ahead of the leading edge.

Since the component 82 is subsonic the flow will enter the rotor passages 40 without the formation of normal shock waves.

The rotor passages preferably decrease in cross sectional area rearward therealong up to a throat 90. The auxiliary blade or element 42 in each passage has its leading edge preferably adjacent to or somewhat downstream from the throat. The leading edge LE of the auxiliary element or blade 42 is preferably less inclined, or is more normal, to the relative flow vector 80 than the leading edge of the main blade, so as to precipitate a shock wave 91 which will stand in a position a short distance ahead of the edge. Aft of the shock wave the fluid velocity will be subsonic and accordingly can enter the stator shock wave losses.

The supersonic flow entering the rotor passages decreases in speed because of the rearwardly decreasing cross sectional areas. The flow remains supersonic but the velocity decreases toward the value of Mach Number 1 at the throat. The minimum loss will occur if the shock wave occurs with the lowest Mach number. Accordingly the auxiliary element or auxiliary blade 42 has its leading edge near the throat. It will precipitate and stabilize a shock wave near its leading edge.

The rotor blades preferably have relatively sharp leading edges as shown in Fig. 3.

The stator passages 55 and 63, Figs. 4 and 5 preferably diffuse the flow therein by having increasing cross sectional areas rearwardly therealong.

The flow leaving the first stator passages 55 is preferably subsonic but is supersonic relative to the blades of the second rotor because of their peripheral speed.

In the passages of the second rotor 16 the flow is treated and behaves as in the first rotor.

In both rotors the blades increase in thickness rearward along a portion of their chord lengths defining a throat between each pair.

Preferably the auxiliary element has a relatively blunt nose radius but it may also be relatively sharp as shown in Fig. 6.

The nose 100 as shown in Fig. 6 is concave on each side to cause compression in the supersonic flow by deflecting it sideways. The rearward accumulation of shock waves 102 will precipitate a strong shock wave which will convert the velocity to a subsonic value and prepare the flow for entrance into the stator.

Preferably the rearward inclination of the leading edges of the rotor blades increases from the root to the tip of each blade. Values of the angle B, Fig. 1, measured between the leading edge and a radial line from the axis of rotation through the leading edge of the rotor blade 36 preferably lie in the range of 30 to 60 degrees. For flows which deviate from parallelism with the axis of rotation the angle B should be measured between the leading edge and the direction of the normal to the relative flow.

Figure 8:
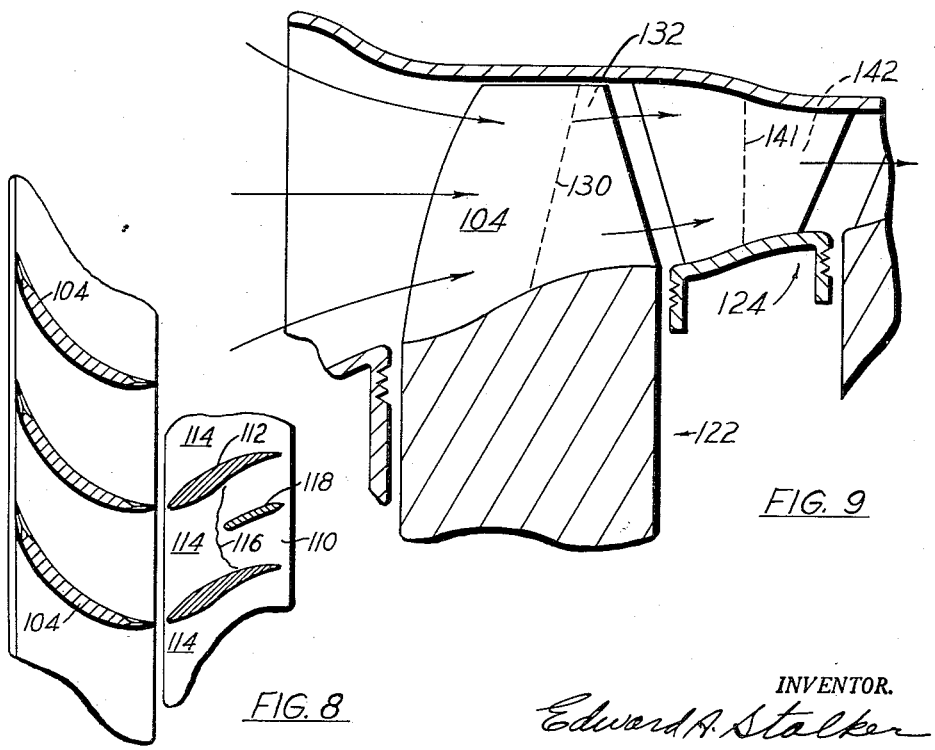
Fig. 8 is a fragmentary development of the rotor blading of the front rotor of Fig. 7 with the blades in section taken on line 8—8 in Fig. 7.

In another form of the invention, Figs. 7 and 8, no auxiliary elements are used in the rotor which discharges its fluid at supersonic velocity into the stator 110. The stator comprises the peripherally spaced blades 112 with stator flow passages 114 between them. The cross sectional areas preferably decrease along the front portions of each passage and increase along the rear portions defining a throat therebetween.

An auxiliary element 118 preferably of blade shape is positioned in the rear portion of each stator passage with its leading edge preferably adjacent to the throat for precipitating a normal shock wave 116.

The stator blades, Figs. 7 and 8, have inclined leading edges preferably in the range of angles from 30 to 60 degrees as for the rotors. These edges preclude the occurrence of shock waves on them although the flow is supersonic relative to the blades and case.

The leading edges LE of the auxiliary blade shaped elements are preferably normal to the flow direction, Fig. 7, to precipitate shock waves in the neighborhood of the throat.

The shock wave converts the supersonic velocity to a lower value preferably a subsonic one at the exits of the stator passages.

The blades are preferably curved and closely spaced so that the normal projection of the leading edge of a following blade of a pair lies forward of the mid point of the chord of the leading blade.

Figure 9:
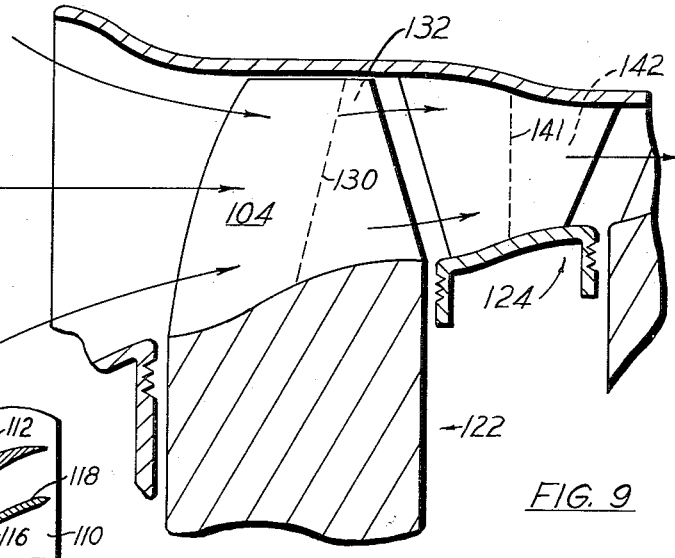
Fig. 9 is a fragmentary axial section of another form of the invention.

The compressor may also have auxiliary elements or blades in both the rotor 122 and the stator 124 as shown in Fig. 9 to progressively reduce the supersonic velocity entering a rotor to a lower value, preferably a subsonic value. In this machine the leading edges 130 of the auxiliary elements 132 are not normal to the local flow but are inclined somewhat to the local flow in the rotor so that they precipitate weaker shock waves which reduce the fluid velocity but not to subsonic values. In the stator the leading edges 141 of the auxiliary elements 142 are preferably normal so that another shock wave occurs which brings the fluid velocity to a lower value preferably a subsonic one.

It will now be clear that I have provided a compressor which can operate at high pressure ratios per stage efficiently because the shock wave is stabilized in the rotor passages near the throat where the Mach number is close to the value 1. The structure for doing this is rugged and free from moving parts. It can accordingly operate at very high Mach numbers and accomplish pressure ratios several times those of subsonic machines.

While I have illustrated specific forms of the invention, it is to be understood that variations may be made therein and that I intend to claim my invention broadly as indicated by the appended claims.

I claim:

1. In combination in an axial flow compressor for an elastic fluid, a case, an axial flow rotor having an axis of rotation and including a plurality of peripherally spaced main blades having rotor flow passages therebetween for conduction of said fluid at supersonic speed relative to said rotor, an auxiliary element in each said passage with the leading edge thereof positioned forward from the trailing edges of said blades, each said leading edge being substantially more normal to said axis and said flow in said passages than the leading edges of said main blades to precipitate a shock wave at the leading edge of said element, and means mounting said rotor in said case for rotation of said blades at a tip speed relative to said case greater than the velocity of sound in said fluid upstream from said blades.

2. In combination in an axial flow compressor for an elastic fluid, a case, an axial flow rotor in said case having an axis of rotation and including a hub and a plurality of peripherally spaced main blades thereon with rotor flow passages between said blades for conduction of said fluid at supersonic speed relative to said rotor blades, said case, said hub and said blades cooperating to provide each said rotor passage with a front portion of decreasing cross sectional area rearwardly therealong succeeded by a portion of rearwardly increasing cross sectional area defining a throat between the front and rear sides of said rotor, each said rotor blade having its leading edge inclined by at least 30 degrees to a radial line from said axis through said edge to provide fluid velocity components of subsonic values normal to said edge, an auxiliary element in each said passage extending radially thereacross from the top to the bottom thereof with the leading edge of each said element positioned adjacent to said throat and substantially normal to said axis and to said flow in each of said passages to precipitate a shock wave at the leading edge of each said element, and means mounting said rotor in said case for rotation of said rotor blades at a tip speed relative to said case greater than the velocity of sound in said fluid immediately ahead of said rotor blades.

3. In combination in an axial flow compressor for an elastic fluid, a case, an axial flow rotor in said case having an axis of rotation and including a hub and a plurality of peripherally spaced main rotor blades with rotor flow passages therebetween for conduction of said fluid at supersonic speed relative to said rotor, said case, said hub and said blades cooperating to provide each said rotor passage with a front portion of decreasing cross sectional area rearwardly therealong succeeded by a portion of rearwardly increasing cross sectional area defining a throat between the front and rear sides of said rotor, each said rotor blade having its leading edge inclined rearwardly by at least 30 degrees to a radial line from said axis through said edge to provide velocity components of said fluid of subsonic values normal to said edge, an auxiliary element in each said passage extending radially thereacross from the top to the bottom thereof with the leading edge of each said element positioned downstream from said throat and directed substantially more normal to said axis and said flow in said passage than the leading edge of each of said main blades to precipitate a shock wave at each said element, and means mounting said rotor in said case for rotation of said rotor blades at a tip speed relative to said case greater than the velocity of sound in said fluid immediately ahead of said rotor blades.

4. In combination in an axial flow compressor for an elastic fluid, a case, an axial flow rotor in said case having an axis of rotation, a plurality of stator blades positioned in said case downstream adjacent to said rotor with stator flow passages between said stator blades, said rotor including a hub and a plurality of peripherally spaced main blades thereon with rotor flow passages therebetween for conduction of said fluid at supersonic speed relative to said rotor, said case, said hub and said blades cooperating to provide each said rotor passage with a front portion of decreasing cross sectional area rearwardly therealong succeeded by a portion of rearwardly increasing cross sectional area defining a throat between the front and rear sides of said rotor, each said rotor blade having its leading edge inclined rearwardly by at least 30 degrees to a radial line from said axis through said edge to provide velocity components of said fluid of subsonic values normal to said edge, an auxiliary element in each said rotor passage extending radially thereacross from the top to the bottom thereof with the leading edge of each said element positioned downstream from said throat and directed substantially more normal to said axis and said flow in said rotor passage than the leading edge of each of said main blades to precipitate a shock wave at each said element and reduce said supersonic velocity to a subsonic value for entrance into said stator flow passages; and means mounting said rotor in said case for rotation of said rotor blades at a tip speed relative to said case greater than the velocity of sound in said fluid immediately ahead of said rotor blades.

5. In combination in an axial flow compressor for an elastic fluid, a case, an axial flow rotor in said case having an axis of rotation and including a hub and a plurality of peripherally spaced main rotor blades thereon with rotor flow passages between said blades for conduction of said fluid at supersonic speed relative to said rotor, said case, said hub and said blades cooperating to provide each said rotor passage with a front portion of decreasing cross sectional area rearwardly therealong succeeded by a portion of rearwardly increasing cross sectional area defining a throat between the front and rear sides of said rotor, each said rotor blade having its leading edge inclined rearwardly by at least 30 degrees to a radial line from said axis to reduce velocity components of said fluid to subsonic values normal to said edge, an auxiliary element extending radially thereacross from the top to the bottom thereof and having its leading edge adjacent to said throat and directed substantially more normal to a radial line from said axis and to said flow in said rotor passage than the leading edge of a said main rotor blade, the forward portion of each said auxiliary element being concave to said rotor passage flow on at least one side thereof to precipitate a shock wave to reduce said supersonic velocity, and means mounting said rotor in said case for rotation of said blades at a tip speed relative to said case greater than the velocity of sound in said fluid immediately ahead of said blades.

6. In combination in an axial flow compressor for an elastic fluid, a case, an axial flow rotor in said case having an axis of rotation and including a hub and a plurality of peripherally spaced main rotor blades carried thereon with rotor flow passages between said blades for conduction of said fluid therein at supersonic speed relative to said rotor blades, a plurality of stator blades positioned in said case downstream adjacent to said rotor with stator flow passages between said stator blades for receiving said flow from said rotor into said stator flow passages at supersonic speed, each said stator blade having an inclined leading edge to receive said flow thereacross with a subsonic component of velocity normal to said leading edge thereof, an auxiliary element in each said stator flow passage extending radially thereacross from the top to the bottom thereof with the leading edge thereof downstream from the inlet of said stator passage and directed more normal to a radial line from said axis and to said flow in said stator passage than the leading edge of said rotor blade to reciprocate a shock wave at said element to substantially reduce the velocity of said flow, and means mounting said rotor in said case for rotation of said rotor blades at a tip speed relative to said case greater than the speed of sound in said fluid immediately ahead of said rotor blades.

7. In combination in an axial flow compressor for an elastic fluid, a case, an axial flow rotor in said case having an axis of rotation and including a hub and plurality of peripherally spaced main rotor blades thereon with rotor flow passages therebetween for conduction of said fluid therein at supersonic speed relative to said rotor, said case and hub bounding said passages on radially opposite sides thereof, said rotor having blades of inclined leading edges, a plurality of stator blades positioned in said case downstream adjacent to said rotor with stator passages between said stator blades for receiving said fluid from said rotor into said stator passages at supersonic speed, each said stator blade having an inclined leading edge to receive said flow thereacross with a subsonic component of velocity normal to said leading edge thereof, an auxiliary element carried on said hub in each said rotor passage and extending radially thereacross from the top to the bottom thereof with an inclined leading edge positioned downstream from the inlet of said rotor passage and less inclined to a radial line from said axis and to the flow in said passage than the leading edges of said rotor blades, an auxiliary element positioned in each said stator passage and having the leading edge thereof positioned downstream from the leading edges of said stator blades and more normal to said axis and said flow in said stator passage than the leading edges of said stator blades, said auxiliary elements serving to precipitate shock waves and progressively reduce said supersonic fluid velocity to a lower value, and means mounting said rotor in said case for rotation of said rotor blades at a tip speed relative to said case greater than the speed of sound in said fluid immediately ahead of said rotor blades and for discharging said fluid into said stator passages at speeds relative to said stator blades greater than the speed of sound in said fluid leaving said rotor.

8. In combination in an axial flow supersonic compressor, a plurality of stages of axial flow main blades with flow passages therebetween, surfaces at radially opposite ends of said blades bounding said passages and defining an annular channel for flow of said fluid therethrough, at least one of said stages being rotatable about an axis, said blades extending radially across said channel, said surfaces and said blades of at least one of said stages cooperating to provide each said passage thereof with front portions of decreasing cross sectional areas rearwardly therealong succeeded by portions of increasing cross sectional areas rearwardly therealong defining throats between the front and rear sides of said stage, each last said blade having its leading edge substantially inclined by at least 30 degrees to a radial line from said axis through said leading edge and to a line normal to the direction of said flow to provide fluid velocity components of subsonic magnitudes normal to said edge, an auxiliary element in each last said passage extending radially thereacross from the top to the bottom thereof with the leading edge of each said element positioned adjacent to a said throat and more normal relative to said axis than the leading edge of the adjacent said main blades to precipitate a shock wave adjacent to the leading edge of each said element, and means mounting said rotatable stage in said case for rotation of said blades thereof at high speed delivering said fluid across said blades with said inclined leading edges at fluid speeds relative to the last said blades greater than the speed of sound in said fluid immediately ahead of the last said blades.

9. In combination in an axial flow supersonic compressor, a plurality of stages of axial flow blades with flow passages therebetween for conducting an elastic fluid at supersonic speed relative to said blades, surfaces at radially opposite ends of said blades bounding said passages and defining an annular flow channel for flow of fluid therethrough from stage to stage thereof, at least one of said stages being rotatable about an axis and another of said stages adjacent thereto being a stator stage, said blades extending radially across said channel, each of said blades having its leading edge substantially inclined by an angle of at least 30° to a radial line from said axis through said leading edge and to a line normal to the direction of said flow to provide fluid velocity components of subsonic magnitudes normal to said edge, an auxiliary element in each said flow passage extending radially thereacross from the top to the bottom thereof with the leading edge of each said element extending more normal relative to said axis and the direction of said flow than the leading edges of the adjacent blades to precipitate a shock wave adjacent the leading edge of each said element, and means mounting said rotatable stage for rotation of said blades at high speed inducing a flow of fluid across said blades at fluid speeds greater than the speed of sound in said fluid immediately ahead of said blades.

References Cited in the file of this patent

UNITED STATES PATENTS

| | | |
|---|---|---|
| 1,997,506 | Adamcikas | Apr. 9, 1935 |
| 2,435,236 | Redding | Feb. 3, 1948 |
| 2,628,768 | Kantrowitz | Feb. 17, 1953 |

FOREIGN PATENTS

| | | |
|---|---|---|
| 390,486 | Germany | Feb. 20, 1924 |
| 630,747 | Great Britain | Oct. 20, 1949 |